June 25, 1946.  W. FENTON  2,402,616
AIR LINE CONNECTOR
Filed Aug. 17, 1943

INVENTOR.
Warren Fenton
BY Morris Michael Marks
Attorney

Patented June 25, 1946

2,402,616

UNITED STATES PATENT OFFICE 2,402,616

AIR-LINE CONNECTOR

Warren Fenton, Philadelphia, Pa.

Application August 17, 1943, Serial No. 499,020

2 Claims. (Cl. 284—18)

My invention relates to air line connectors, and it relates more particularly to connectors such as those adapted to be used for the connection of an inflatable tire with an air-pressure equalizer or a tire-alarm, or the like, in a manner to permit free flow of air therebetween. It is to be understood that, while the term "air" is used herein, any gas could be used in the device of my invention.

There has long been felt a great need for a practicable air pressure equalizer, capable of equalizing the internal pressures of dual tires, or of the various tires on which a vehicle is supported. There has also long been felt a great need for a suitable tire-alarm adapted to warn the driver of the vehicle when a tire is either leaking or "blown out." Such equalizers and tire-alarms have been invented and are admirably suited for this purpose, as, for instance, the equalizer and tire-alarm embodied in my United States Letters Patent No. 2,056,064 entitled "Alarm and inflation equalizer for pneumatic tires." Yet, it has been hitherto impossible practicably to use these equalizers or tire-alarms because no adequate means had been discovered for satisfactorily transmitting a free flow of air between the tire and the equalizer or tire-alarm. The chief difficulty appears to have been that, whereas the equalizer or tire-alarm would be mounted on a given vehicle, it would have to be capable of satisfactory air line connection with any commercially available tire. These tires are equipped with a standard valve stem containing a standard type tire valve capable of permitting entrance of air therethrough while checking or preventing discharge therefrom.

One problem has been to provide dependable means, for connecting the equalizer or tire-alarm to the tire, which are capable of ready and facile connection by any service station attendant or mechanic, without special knowledge of the workings of the device. Another problem has been to provide such connecting means capable of utilization in conjunction with the standard tire valve assembly so that it is possible to use the same tire interchangeably with the equalizer or tire-alarm assembly, or with a standard tire valve, as desired.

One object of my invention, therefore, is to provide an air line connecting means operable dependably to connect an air-pressure equalizer or tire-alarm with a standard type pneumatic tire.

Another object of my invention is to provide an air line connecting means adapted to be used in conjunction with a standard tire valve stem and connectible therewith in a manner externally substantially similar to that in which a standard air hose or cap is connectible therewith, so that the connecting may safely be done by any service station attendant or mechanic, regardless of the extent of his experience with my device.

A further object of my invention is to provide an air line connecting means capable of transmitting a free flow of air from a flexible tube to a flexible tire without loss of air therebetween, regardless of variation of air pressure therein or air flow therethrough.

Another object of my invention is to provide an air line connector which shall be safe and sure in operation despite the existence of vibration, momentum or violent blows of "bumps" on the assembly on which it is mounted, or the action of heat or cold thereon.

With the above and other objects in view, my invention consists of an air line connector adapted to connect a flexible tube to a standard tire valve having a longitudinal channel opening at one end into the interior of a tire tube, and at the other into a valve chamber, a valve seat in said valve chamber, said chamber being interiorly threaded at the outer end thereof, said connector comprising a hollow stem having a forward end and a rearward end; a frustro-conical gasket mounted thereon, in air-tight relation thereto, and with its narrower end directed toward the forward end of said hollow stem; a threaded sleeve rotatably mounted on the hollow stem posterior of said gasket, the diameter and pitch of the threads thereof being substantially identical to the diameter and pitch of said internal threads of said standard tire valve stem; means for rotating said sleeve on said stem; an abutment disposed between said sleeve and said stem and adapted to transmit forward motion of said sleeve to said stem; another abutment disposed between said sleeve and said stem and adapted to transmit rearward motion from said sleeve to said stem; the rearward end of said stem being adapted to be disposed within, open into, and in air-tight connection with, a flexible tube; and said gasket being adapted to bear against, and in air-tight connection with said valve seat when said threaded sleeve is threadedly connected with, and urged into, said valve chamber, of said standard tire valve stem.

My invention further consists of an air line connector comprising a hollow stem projecting forwardly from a flexible hose and in air line connection therewith and adapted to transmit air into the air line channel of a standard type tire valve stem, an air seal disposed about and in proximity to the forward end of said stem and adapted to bear against the valve seat of said tire valve stem; a threaded sleeve rotatably mounted on said stem; means for limiting longitudinal displacement of said sleeve with respect to said stem; the diameter and pitch of said threads being substantially identical to the diameter and pitch of the internal threads of said standard type tire valve stem; an external sleeve disposed behind said threaded sleeve in a manner to limit longitudinal displacement of said sleeves one with another; said external sleeve being internally threaded, the diameter and pitch of said threads being substantially identical to the diameter and pitch of the external threads of said standard valve stem; and said external sleeve being rotatable with respect to said flexible hose.

For the purpose of illustrating my invention, I have shown in the accompanying drawing forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring now to the drawing in which like reference characters indicate like parts:

Figure 1:
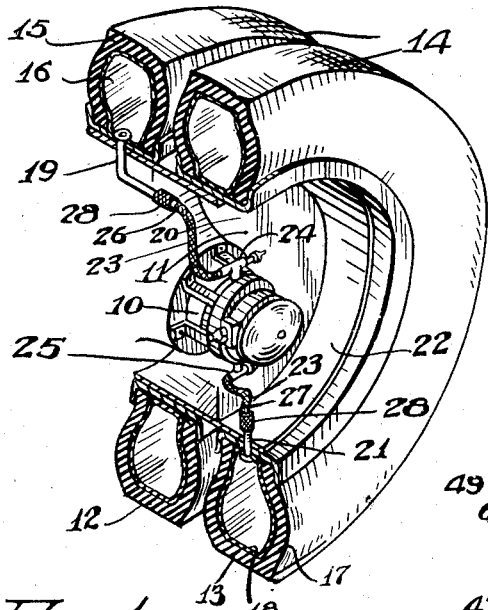
Figure 1 represents a sectional view in perspective of an air-pressure equalizer and tire alarm, connected with a dual tire assembly by means of air line connectors embodying my invention.
Figure 4:
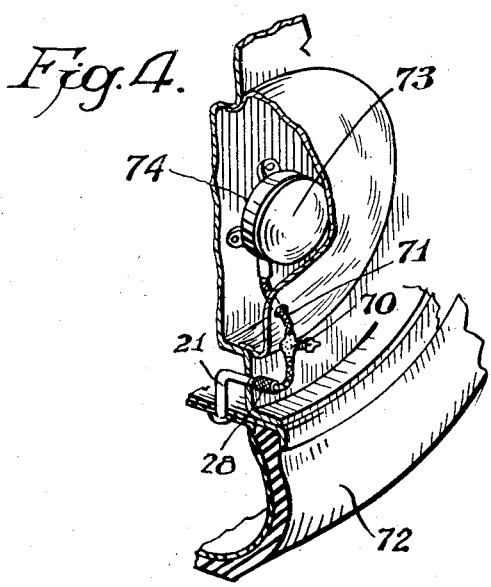
Figure 4 represents a fragmentary view in perspective of a tire-alarm connected with a tire by means of an air line connector embodying my invention, and showing a modified embodiment of said connector.

My invention is adapted for use in conjunction with an air-pressure equalizer and tire alarm such as is illustrated in Figure 1 or in conjunction with the tire-alarm assembly alone, such as that illustrated in Figure 4, or in conjunction with any other means or device requiring a continuous air-flow connection with the interior of a pneumatic tire. Thus, as illustrated in Figure 1, I provide an air-pressure equalizer and tire alarm 10 mounted in proximity to the hub of a wheel 11 having two tires 12, 13 mounted thereon in a dual tire assembly 14. The inside tire 12 consists of the shoe 15 and tire tube 16; and the outside tire 13 consists of the shoe 17 and the tire tube 18. A standard L-shaped valve stem 19 extends from the interior of the inner tube 16 of the inside tire 12 through the web 20 of the wheel 11. A standard, straight valve stem 21 extends from the interior of the inner tube 18 of the outside tire 13 through the rim 22 of the wheel 11. Flexible tubes 23, preferably made of wire-mesh sheathed rubber or other air-tight, flexible material, are each permanently secured at one end thereof in air line connection with the air-pressure equalizer and tire alarm assembly 10 as at 24 and 25. The other ends 26 and 27 of the flexible tubes 23 are respectively connected to the valve stems 19 and 21 by means of the air line connectors 28.

Figures 2, 3:
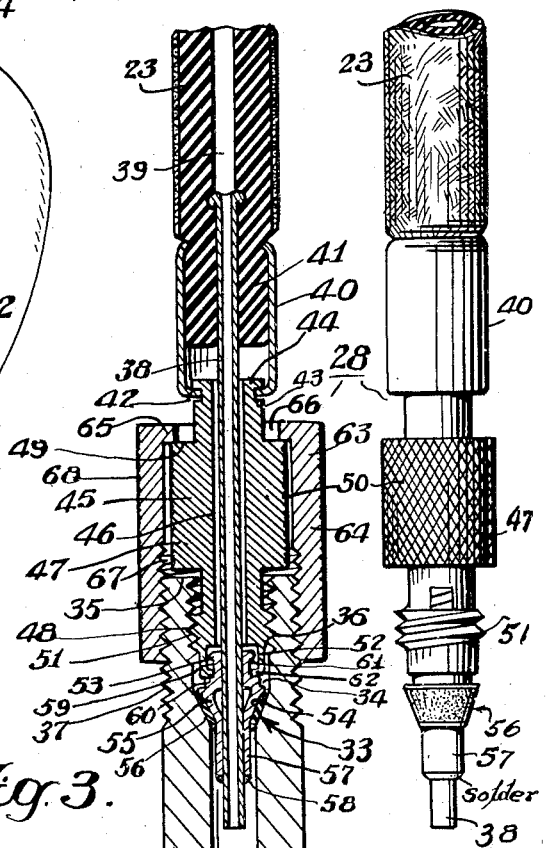
Figure 2 represents an elevational view of the male member of an air line connector embodying my invention.
Figure 3 represents a vertical sectional view of an air line connector embodying my invention.

In Figure 3, the air line connector 28 is shown in conjunction with the tire valve stem 21. It is to be understood, however, that the air line connector of my invention is just as adaptable to the tire valve stem 19, with which it is likewise shown in Figure 1. The valve stem 21 is secured to the inner tube 18 by any suitable means such as the collar or ferrule 29, and comprises the hollow stem portion 30 through which is drilled or otherwise formed a central orifice or duct 31 extending from the interior 32 of the inner tube 18 to the valve seat 33. A valve chamber 34 extends outwardly from the valve seat 33 to the outward edge 35 of the valve stem 21. The valve chamber 34 is internally threaded as at 36, and the stem 21 is externally threaded as at 37 in proximity to the outward edge 35 thereof. This structure is substantially as now exists in virtually all standard tire valve stems. As such valve stems are now supplied with tire-tubes, they often contain a valve core (not shown) which is adapted to coact with the valve stem to permit inflow of air to the tire while preventing undesired outflow therefrom through the valve. In the use of my invention, this valve core is removed, by means well-known by service station attendants, and its place is taken by the air line connector 28.

The air line connector 28 comprises a hollow stem 38 disposed at one end thereof within the central orifice or duct 39 of the flexible tube 23. In practice, this stem may be made of a larger external diameter than the internal diameter of the duct, 39, and then forced thereinto a suitable distance against the flexible resistance of the rubber hose 23; or it may be vulcanized within said hose; or by any other suitable means it may permanently be disposed therein. If desired, a ferrule 40 is clamped on the forward end 41 of the flexible tube 23 in a manner further to enhance the grip of said tube on the stem 38. The forward end of the ferrule may then be inwardly turned as at 42 into a groove 43 formed at the rearward end 44 of a sleeve 45 rotatably mounted on the stem 38, operably to anchor said sleeve 45 against longitudinal displacement with respect to said stem 38.

The sleeve 45 has axially disposed therethrough a bearing 46, and comprises a rearward, anchor portion 44, which is in anchored engagement with the ferrule 40 as at 43; a central knob portion 47; and a forward male member 48. The anchor portion 44 is preferably of a reduced diameter with respect to either the knob 47 or the ferrule 40. The knob 47 has a rearward wall 49, and a preferably knurled surface 50 on its preferably cylindrical face, so as to enable a service station attendant or mechanic to grasp it between the thumb and forefinger of one hand, and rotate the sleeve 45 thereby. The forward male member 48 is of a diameter substantially equal to the diameter of the valve chamber 34 of the standard tire valve stem 21, and is threaded as at 51 to a pitch substantially identical to the pitch of the internal threads 36 of said valve chamber 34. The internal diameter of the forward end of the bearing 46 is increased as at 52 to enable it to receive, and rotate about, the anchoring end 53 of a valve plug 54.

The valve plug 54 comprises a rearward, anchoring end 53, a frusto-conical portion 55 having disposed thereabout a valve gasket 56, made of rubber, leather or other suitable material, and a forward sleeve 57 snugly embracing the forward end of the hollow stem 38, and in air-seal relation to the outer surface thereof, said air-seal being accomplished by any suitable means such as solder 58 or the like. The anchoring end 53 has formed therein a groove 59 comprising a forward wall 60 and a rearward wall 61; and the forward edge 62 of the sleeve male member 48 is inwardly turned about the anchoring end 53 and into the groove 59 operably to anchor therein.

An external sleeve 63 is disposed about the sleeve 45, and comprises the hollow cylinder 64 of an internal diameter greater than the external diameter of the knob 47. A radial wall 65 extends inwardly from the rearward end of the hollow cylinder 64 and terminates in a cylindrical bearing 66 of an internal diameter greater than the external diameter of the ferrule 40 and less than the diameter of the knob 47, operably to limit the forward displacement of the external sleeve 63 while permitting it to ride rearwardly over the ferrule 40, and flexible hose 23. The forward internal cylindrical wall of the sleeve 63 is threaded as at 67 to a pitch and diameter substantially identical to that of the external threads 37 of the valve stem 21. The outside cylindrical face of the external sleeve 63 is preferably knurled as at 68 so as to enable a service station attendant or a mechanic to grasp it between the thumb and forefinger of one hand operably to rotate the same.

In operation, the valve core (not shown) is removed from the standard valve stem 21 in accordance with known practice. The external sleeve 63 is slid back over the hose 23 and the male member 48 is then inserted within the valve stem and the knob 47 is turned until the threads 51 thereof engage and are turned into the threads 36 of the valve chamber. Continued rotation of the knob 47 causes the turned end 62 of the sleeve 45 to bear against the forward wall 60 of the valve plug groove 59 operably to urge the valve plug 54 forward into the valve chamber 34 until the frustro-conical gasket 56 bears against the valve seat 33 in air sealing relation thereto.

This forward motion of the sleeve 45 carries with it the ferrule 40 anchored thereto, and the flexible hose 23 to which the ferrule 40 is clamped. Moreover, the forward motion of the valve plug 55 carries with it the hollow stem 38 to which it is exteriorly sealed at 58, said hollow stem leading directly to the interior duct 39 of the flexible hose 23.

The exterior sleeve 63 is then slid forward over the hand-turned knob 47 until the internal threads 67 engage the external threads 37 of the valve stem 21. The operator then grasps the knurled outer surface 68 of the sleeve 63 between the thumb and forefinger of one hand and turns it until the outer sleeve 63 is in tightly threaded engagement with the external threads 37 of the valve stem 21, with the forward edge of the rearward wall 65 of the external sleeve bearing snugly against the rearward wall 49 of the knob 45.

In Figure 4 is illustrated a modified embodiment of my invention wherein an inlet valve 70 is disposed in the flexible hose air line 71 between the air line connector 28 mounted on the valve stem 21 of a tire 72 and a tire alarm 73 mounted on the hub 74 of a vehicle.

It may now be seen that by the use of my invention an effective air seal is provided within the valve stem, whereby air can flow only through the hollow stem 38 connecting the interior of the valve stem directly to the interior of the flexible hose; and effective means are provided for preventing the vibrations, bumps and other vagaries of the vehicle in motion from breaking the air seal of the connector 28. Moreover, assembly and disassembly is done entirely by hand and requires only the strength of a normal hand for its operation. Indeed, there is no opportunity afforded for the use of wrenches which could, because of their varying mechanical advantages, strip the threads of the valve stem.

Should it be desired to replace a tire, it is only necessary to unscrew the outer sleeve 63 and slide it over the flexible hose 23, and then unscrew the knob 47 to release the valve stem 21 from the connector 28. In this connection it should be noted that by the use of my invention it is impossible to lose the outer sleeve 63 when the hose is uncoupled.

In the event that it is desired to use such a replaced tire in a vehicle not equipped with a tire alarm or an equalizer 51 other device requiring a constant flow air connector, it is merely necessary to replace the valve core (not shown) within the valve stem.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I claim as new, and desire to secure by Letters Patent is:

1. An adapter for connecting a flexible hose to a standard tire valve stem having an inner end and an outer end, a valve chamber having an inner end and an outer end and adjacent said outer end of said valve stem, a duct leading from said inner end to said valve chamber and a valve seat at the inner end of said valve chamber, the outer end of said valve chamber being internally threaded; said adapter comprising a hollow tubular conduit having an internal duct longitudinally disposed therethrough, said conduit being at one end thereof in air-line communication with the interior of said flexible hose and in air-seal relation to the exterior thereof; a valve plug adjacent the other end of said conduit and disposed about the exterior thereof and in air-seal relation thereto; a thrust bearing disposed on said valve plug; a thrust bearing disposed adjacent said end portion of said flexible hose; and a sleeve having an inner end portion and an outer end portion and rotatably mounted on said hollow tubular conduit intermediate said flexible hose and said valve plug and adapted to rotate within each of said thrust bearings, said outer end portion being externally threaded and adapted to be threadedly engaged with the internally threaded portion of said valve stem operably to draw said valve plug into air-seal relation to said valve seat.

2. An adapter for connecting a flexible hose to a standard tire valve stem having an inner end and an outer end, a valve chamber having an inner end and an outer end and adjacent said outer end of said valve stem, a duct leading from said inner end to said valve chamber, a valve seat at the inner end of said valve chamber, the outer end of said valve chamber being internally threaded, and the outer end of said valve stem being externally threaded; said adapter comprising a hollow tubular conduit having an internal duct longitudinally disposed therethrough, said conduit being at one end thereof in air-seal communication with the interior of said flexible hose and in air-seal relation to the exterior thereof; a valve plug adjacent the other end of said conduit and disposed about the exterior thereof and in air-seal relation thereto; a thrust bearing disposed on said valve plug; a thrust bearing disposed adjacent said end portion of said flexible hose; an internal sleeve having an inner end portion and an outer end portion and rotatably mounted on said hollow tubular conduit intermediate said flexible hose and said valve plug and adapted to rotate within each of said thrust bearings, said outer end portion being externally threaded and adapted to be threadedly engaged with the internally threaded portion of said valve stem operably to draw said valve plug into air-seal relation to said valve seat; and an external sleeve having an outer end portion and adapted to be rotatably disposed about said internal sleeve, said outer end of said external sleeve being interiorly threaded and adapted to be threadedly engaged with said externally threaded portion of said valve stem, and means on said external sleeve adapted to bear against a portion of said internal sleeve when said external sleeve is threadedly secured to said valve stem, operable to limit displacement of said internal sleeve.

WARREN FENTON.